UNITED STATES PATENT OFFICE.

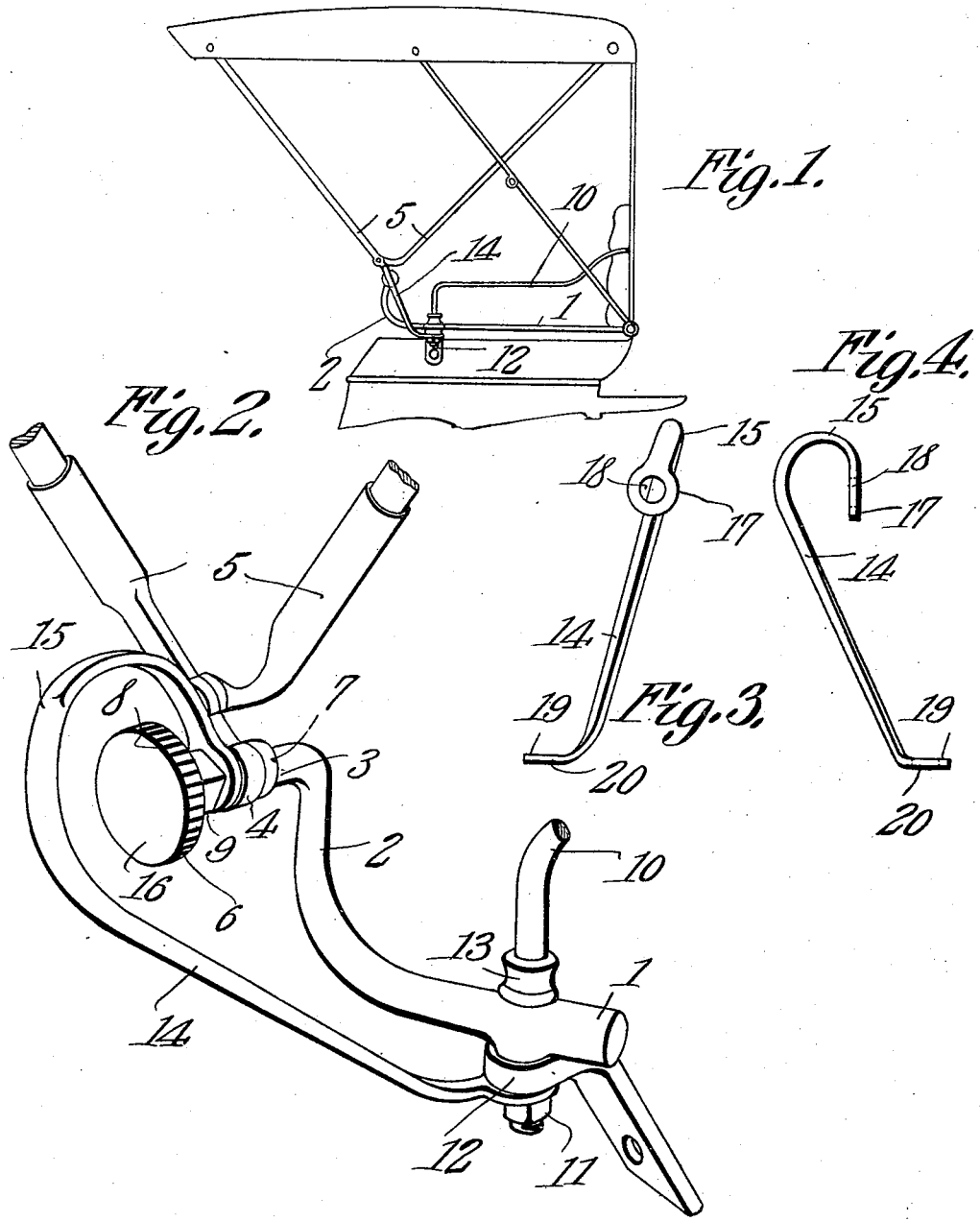

EMILIUS C. F. BECKER, OF MILLEDGEVILLE, GEORGIA.

BUGGY-TOP ATTACHMENT.

968,527.  Specification of Letters Patent.  Patented Aug. 30, 1910.

Application filed October 6, 1909. Serial No. 521,281.

*To all whom it may concern:*

Be it known that I, EMILIUS C. F. BECKER, a citizen of the United States, residing at Milledgeville, in the county of Baldwin and State of Georgia, have invented a new and useful Buggy-Top Attachment, of which the following is a specification.

My invention relates to buggy top attachments, particularly to guards for housing the prop nut and has for an object to provide a simple and inexpensive device of this character that will obviate the annoyance of a person's clothes being caught by the prop nut when stepping into the vehicle.

A further object is to provide an ornamental guard for the prop nut that may be fitted to a buggy top by an unexperienced person and will require only the use of an ordinary buggy wrench for this operation.

The shifting rail of a buggy top is formed at its forward end with a goose neck which terminates in a screw threaded prop bolt upon which the props of the canopy are supported. A prop nut engages the threaded end of the prop bolt and operates to clamp the props tightly against the abutment or bearing shoulder of the prop bolt. It is evident that the goose neck with its prop bolt and nut forms an outwardly projecting hook at the forward end of the seat which is prone to catch the clothing of a person stepping up into the buggy. To obviate this difficulty I have devised a guard consisting of a single piece of metal which arches over the exposed face of the prop nut forming a fender which is devoid of corners and positively prevents any portion of the clothing from hooking underneath the prop bolt and goose neck.

With the above advantages and other objects in view, which will appear as the description proceeds, the invention consists of certain novel details of construction and combination of parts that I shall hereinafter fully describe and claim.

Figure 1 is a fragmentary side elevation of a buggy top with my improved guard for the prop bolt applied thereto. Fig. 2 is an enlarged perspective view of a portion of the top supports of a buggy equipped with the prop bolt guard. Fig. 3 is a front elevation of my improved prop bolt guard. Fig. 4 is a side elevation of the same.

In the accompanying drawing in which like characters of reference designate similar parts wherever they occur in the view shown, 1 designates the shifting rail having formed on its forward end a goose neck 2, the extremity of which constitutes a prop bolt 3 upon which is swiveled the bearing heads 4 of the canopy props 5. The free end of the prop bolt is provided with screw threads upon which travels a prop nut 6 that operates to tightly clamp the bearing heads of the props against the abutment or annular shoulder 7 formed at the juncture of the prop bolt with the goose neck, whereby to prevent the too free pivotal movement of the props. The prop nut 6 is formed to be turned from its periphery and for this purpose is circumferentially milled or serrated, as shown at 8 and is reduced and squared adjacent one end to provide wrench faces 9 as an additional means for advancing the prop nut to any desired position upon the prop bolt. The arm or seat rail 10 is rounded downwardly at its forward end and projects through the shifting rail, where it is screw threaded and provided with a retaining nut 11 which operates to securely clamp the seat bracket 12 against the under side of the shifting rail which latter is prevented from an upward movement upon the seat rail by coming into contact with the stop shoulder 13 of the seat rail.

The above construction is of the usual and well known kind and forms no part of the present invention, my invention residing instead in a housing or fender that, when applied to a buggy top support of this kind will positively prevent any portion of the clothing from catching in the hook formed by the goose neck 2, prop bolt 3, and prop nut 6 above described. The fender or guard consists of a body portion 14 which is formed at the forward end in a hook shaped portion 15 that arches over the exposed face 16 and peripheral edge of the prop nut, and terminates in a flat bearing head 17 having an annular opening 18 that loosely fits the prop-bolt. The terminal bearing head of the guard bears against the bearing head of the props and is held firmly in contact therewith by the prop nut. The opposite end of the body portion is expanded to form a bearing 19 having an angular opening 20 that loosely engages the terminal of the seat rail below the shifting rail. The bearing or eye 19 is held firmly against the seat bracket 12 carried by the seat rail by the retaining nut 11 and is preferably bent at a slight angle to the body portion so as to extend parallel with the shifting rail, whereby to engage the terminal of the seat rail without binding.

The intermediate portion of the guard inclines outwardly from the seat rail and positively prevents any portion of the garments of a person from being caught underneath the prop rail when stepping into the buggy. The hooked portion of the guard is formed in the same plane as the body portion so as to arch over the central portion of the prop nut when in operative position.

It will be noted that the flat terminals of the guard perform the function of the washers against which the prop nut and retaining nut bear, the advantage of this construction being to obviate the use of the usual washers carried by the prop nut and seat rail extensions. It will also be noted that the bearing head 17 of the hooked portion constitutes a non-rotatable element against which the prop nut bears, and is thereby not affected by the rotation of the bearing heads of the props when the canopy is being laid back to its collapsed position.

From the foregoing description taken in connection with the accompanying drawing, it is thought that the construction and operation of my invention will be easily understood without a more extended explanation, it being understood that various changes in the form, proportion and minor details of construction may be made without sacrificing any of the advantages or departing from the spirit of the invention.

What is claimed is:—

1. The combination with a buggy seat and prop bolt, of a guard consisting of a body portion formed at one end with a hook shaped portion extending across the exposed face of the prop nut carried by the prop bolt and having a terminal eye engaging the prop bolt in rear of the prop nut, the other end of the body portion being secured to said seat.

2. The combination with a buggy seat rail and prop bolt, of a guard for the same comprising a body portion formed at its upper end with a hook extending in the same plane as the body portion and arching over the prop nut carried by said prop bolt, said hook terminating in an eye engaging with said prop bolt, said body portion being offset at the lower end and engaging with said seat rail substantially as described.

3. The combination with a buggy seat rail and prop bolt, of a guard consisting of a body portion formed at its upper end with a hooked portion arching over the prop nut carried by said prop bolt and terminating in a washer-like eye engaging the prop bolt, the lower end of said body portion terminating in an eye engaging the terminal of said seat rail substantially as described.

In testimony that I claim the foregoing as my own, I have hereto affixed my signature in the presence of two witnesses.

EMILIUS C. F. BECKER.

Witnesses:
E. A. BAIRD,
H. T. BOTHNELL.